US010989614B2

(12) United States Patent
Nakayama

(10) Patent No.: US 10,989,614 B2
(45) Date of Patent: *Apr. 27, 2021

(54) TORQUE SENSOR AND ROBOT

(71) Applicant: Fanuc Corporation, Yamanashi (JP)

(72) Inventor: Kazutaka Nakayama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/522,455

(22) Filed: Jul. 25, 2019

(65) Prior Publication Data
US 2019/0346321 A1 Nov. 14, 2019

Related U.S. Application Data

(63) Continuation of application No. 15/919,557, filed on Mar. 13, 2018, now Pat. No. 10,444,098.

(30) Foreign Application Priority Data

Apr. 10, 2017 (JP) .............................. JP2017-077806
Dec. 25, 2017 (JP) .............................. JP2017-248252

(51) Int. Cl.
*G01L 5/00* (2006.01)
*B25J 13/08* (2006.01)
(Continued)

(52) U.S. Cl.
CPC ............ *G01L 5/0019* (2013.01); *B25J 13/085* (2013.01); *F16C 19/02* (2013.01); *F16C 19/362* (2013.01);
(Continued)

(58) Field of Classification Search
CPC ....... G01L 5/0019; B25J 13/085; B25J 19/02; F16C 19/02; F16C 19/362; F16C 17/00; F16C 2233/00
(Continued)

(56) References Cited

U.S. PATENT DOCUMENTS 3,182,813 A 5/1965 Goodall et al.
4,471,663 A 9/1984 Wallace
(Continued)

FOREIGN PATENT DOCUMENTS

CN 1191306 A 8/1998
CN 101881674 A 11/2010
(Continued)

OTHER PUBLICATIONS

The State Intellectual Property Office of People's Republic of China; First Office Action for Chinese Application No. 201810244944.1; dated Aug. 28, 2019; 8 pages.
(Continued)

Primary Examiner — Max H Noori
(74) Attorney, Agent, or Firm — Shackelford, Bowen, McKinley & Norton, LLP

(57) ABSTRACT

Provided is a torque sensor that includes: a bearing that is provided with an inner ring and an outer ring that are supported so as to be relatively movable only in the direction of rotation about a predetermined axis; a connecting member that is provided with fixing sections that are respectively fixed to the inner ring and the outer ring and a strain generation section that connects between the fixing sections; and a strain sensor that is disposed on the connecting member so as to be capable of detecting a strain at least in the circumferential direction.

25 Claims, 9 Drawing Sheets

(51) Int. Cl.
*F16C 19/36* (2006.01)
*F16C 19/02* (2006.01)
*B25J 19/02* (2006.01)
*F16C 17/00* (2006.01)

(52) U.S. Cl.
CPC ............... *B25J 19/02* (2013.01); *F16C 17/00* (2013.01); *F16C 2233/00* (2013.01)

(58) Field of Classification Search
USPC .................................................... 73/862.321
See application file for complete search history.

(56) References Cited

U.S. PATENT DOCUMENTS

| | | | |
|---|---|---|---|
| 4,573,362 | A | 3/1986 | Amlani |
| 4,735,102 | A | 4/1988 | Koenig |
| 6,298,736 | B1 | 10/2001 | Girard et al. |
| 10,151,342 | B2 | 12/2018 | Heim et al. |
| 2005/0000304 | A1 | 1/2005 | Smith |
| 2007/0095156 | A1 | 5/2007 | Smith |
| 2010/0005907 | A1 | 1/2010 | Kato et al. |
| 2010/0282001 | A1 | 11/2010 | Sasaki |
| 2011/0185823 | A1 | 8/2011 | Nishikawa et al. |
| 2011/0245006 | A1 | 10/2011 | Negishi |
| 2012/0048628 | A1 | 3/2012 | Kawanami et al. |
| 2016/0195145 | A1 | 7/2016 | Fujiwara |
| 2016/0263749 | A1 | 9/2016 | Ogata |
| 2017/0259436 | A1* | 9/2017 | Nakayama ................ B25J 9/06 |
| 2018/0180154 | A1 | 6/2018 | Gilges et al. |
| 2018/0215054 | A1* | 8/2018 | Brudniok ............ B25J 17/0283 |
| 2019/0019328 | A1 | 1/2019 | Yeoh et al. |
| 2019/0185107 | A1* | 6/2019 | Saiki ........................ B62M 3/16 |
| 2019/0193281 | A1 | 6/2019 | Nakayama |
| 2019/0305618 | A1* | 10/2019 | Mizukoshi ............... B25J 9/108 |

FOREIGN PATENT DOCUMENTS

| | | | |
|---|---|---|---|
| DE | 10243095 | A1 | 4/2004 |
| EP | 0859224 | A2 | 8/1998 |
| EP | 1353159 | A2 | 10/2003 |
| EP | 2248715 | A2 | 11/2010 |
| EP | 3067164 | A2 | 9/2016 |
| JP | S54-153986 | U | 10/1979 |
| JP | S55-151235 | A | 11/1980 |
| JP | S62-034026 | A | 2/1987 |
| JP | 2000-046661 | A | 2/2000 |
| JP | 2002-082003 | A | 3/2002 |
| JP | 2006-300754 | A | 11/2006 |
| JP | 2007-500361 | A | 1/2007 |
| JP | 2008-190890 | A | 8/2008 |
| JP | 2009-288198 | A | 12/2009 |
| JP | 2012-47460 | A | 3/2012 |
| JP | 2013-011442 | A | 1/2013 |
| JP | 2015-007624 | A | 1/2015 |
| JP | 2015-036522 | A | 2/2015 |
| JP | 2016-168647 | A | 9/2016 |
| WO | WO-2004-106877 | A1 | 12/2004 |
| WO | WO-2010-088922 | A1 | 8/2010 |

OTHER PUBLICATIONS

Office Action for German Patent Application No. 10 2018 107 815.3; dated Jan. 28, 2020; 3 pages.

Japan Patent Office, Office Action dated Oct. 23, 2018 for Japan Patent Application No. 2017-248252.

* cited by examiner

TORQUE SENSOR AND ROBOT

CROSS-REFERENCE TO RELATED APPLICATIONS

This application is a continuation of U.S. patent application Ser. No. 15/919,557, filed on Mar. 13, 2018. U.S. patent application Ser. No. 15/919,557 is incorporated herein by reference.

TECHNICAL FIELD

The present invention relates to a torque sensor and a robot.

BACKGROUND ART

In the related art, as a torque sensor that detects a torque in the rotation direction, there is a known torque sensor in which a strain sensor for measuring a strain in a strain body that deforms due to rotation is attached to the strain body (for example, see PTL 1). In a joint of a robot on which loads in various directions act, in order to accurately detect a torque in the rotation direction acting on the joint, a strain cancellation mechanism is constituted of a bridge circuit that uses many strain sensors, to exclude loads in directions other than the rotation direction.

CITATION LIST

Patent Literature

{PTL 1} Japanese Unexamined Patent Application, Publication No. 2012-47460

SUMMARY OF INVENTION

The present invention provides the following solutions.

According to one aspect, the present invention provides a torque sensor including: a bearing that is provided with an inner ring and an outer ring that are supported so as to be relatively movable only in the direction of rotation about a predetermined axis; a connecting member that is provided with fixing sections that are respectively fixed to the inner ring and the outer ring and a strain generation section that connects between the fixing sections; and a strain sensor that is disposed on the connecting member so as to be capable of detecting a strain at least in the circumferential direction.

Furthermore, according to another aspect, the present invention provides a robot to which one of the above-described torque sensors is attached while making the axis of the bearing match with the rotation axis of each joint.

DESCRIPTION OF EMBODIMENTS

A torque sensor 1 and a robot 100 according to one embodiment of the present invention will be described below with reference to the drawings.

Figure 1:
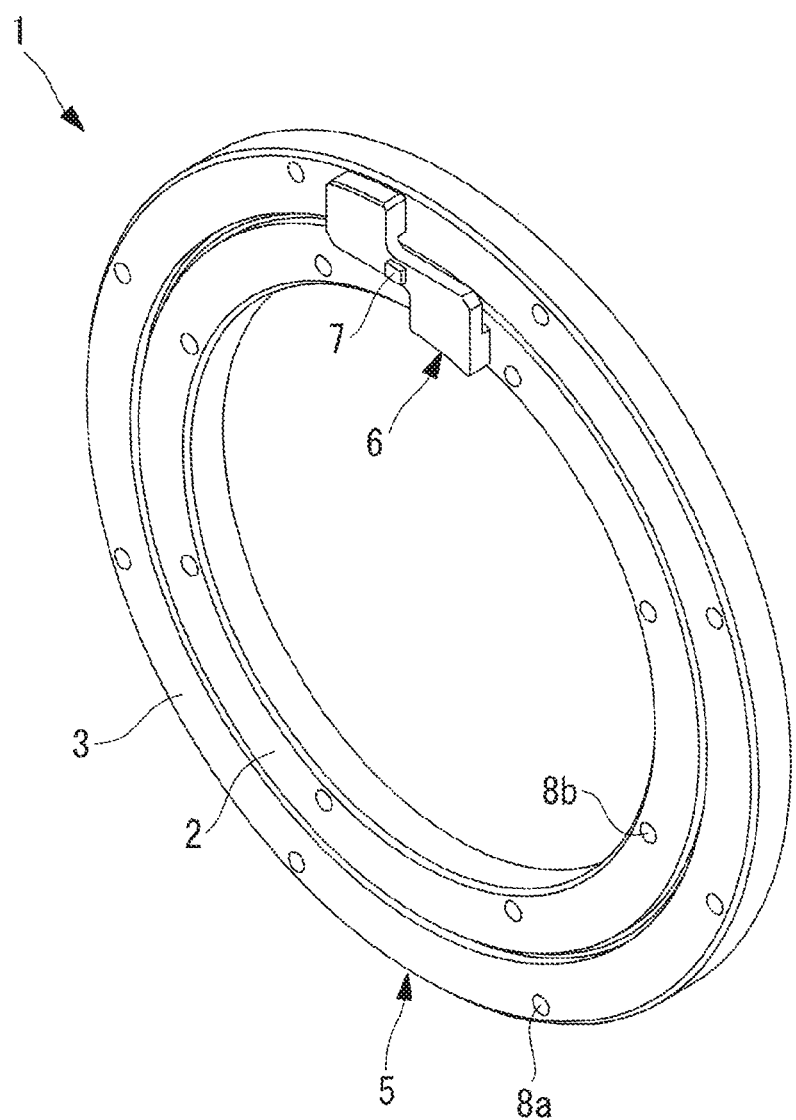
FIG. 1 is a perspective view showing a torque sensor according to one embodiment of the present invention.
Figure 2:
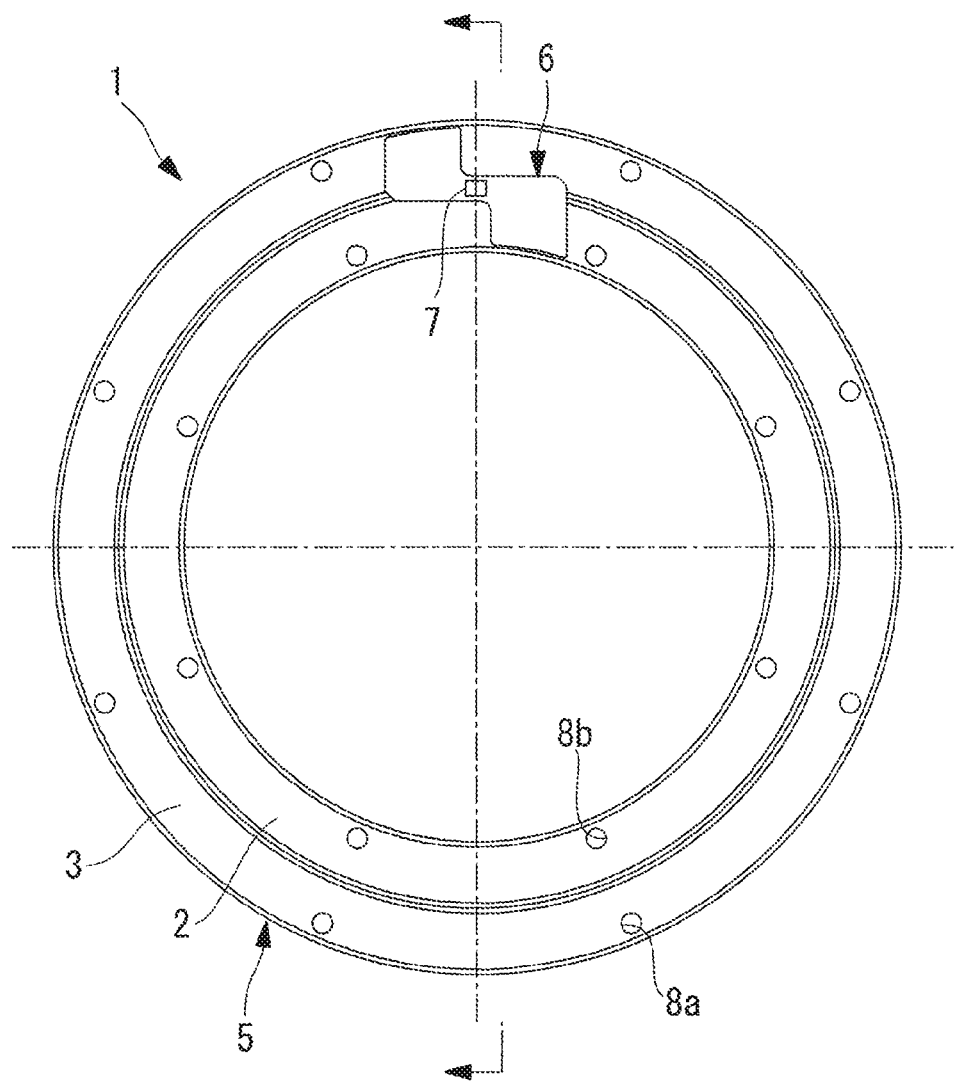
FIG. 2 is a front view showing the torque sensor shown in FIG. 1.
Figure 3:
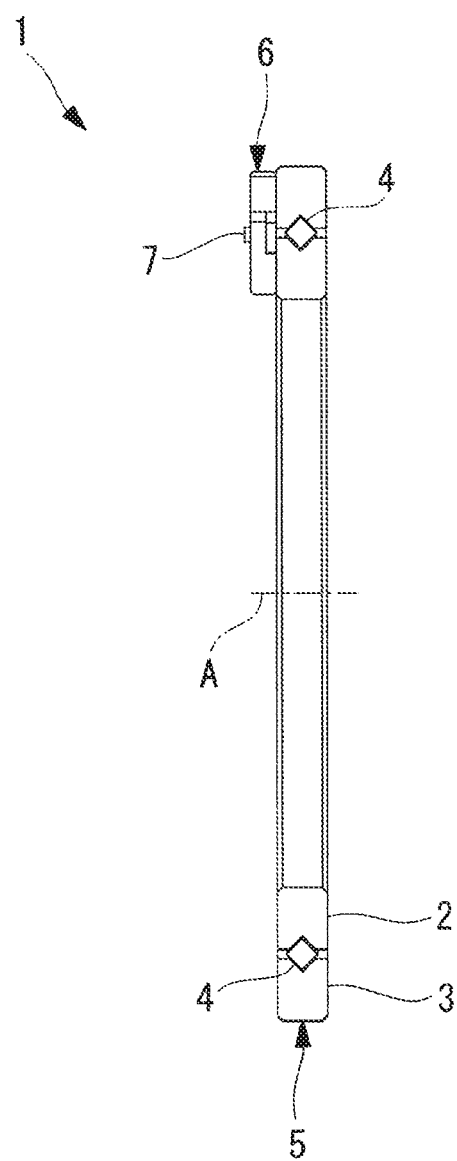
FIG. 3 is a longitudinal sectional view showing the torque sensor shown in FIG. 1.

As shown in FIGS. 1 to 3, the torque sensor 1 of this embodiment is provided with: a cross roller bearing (bearing) 5 that includes an inner ring 2 and an outer ring 3 that are disposed adjacent to each other in the radial direction and a plurality of rollers 4 that are arranged between the inner ring 2 and the outer ring 3 at intervals in the circumferential direction; a connecting member 6 that is fixed to each of the inner ring 2 and the outer ring 3 of the cross roller bearing 5; and a single-axis strain sensor (strain sensor) 7 that is fixed to the connecting member 6.

As shown in FIG. 1, the inner ring 2 and the outer ring 3 of the cross roller bearing 5 are provided with, at intervals in the circumferential direction, through-holes (fixing means) 8a or screw holes (fixing means) 8b that penetrate therethrough in the direction of an axis A, in order to fix the inner ring 2 and the outer ring 3 to detection targets.

Figure 4:
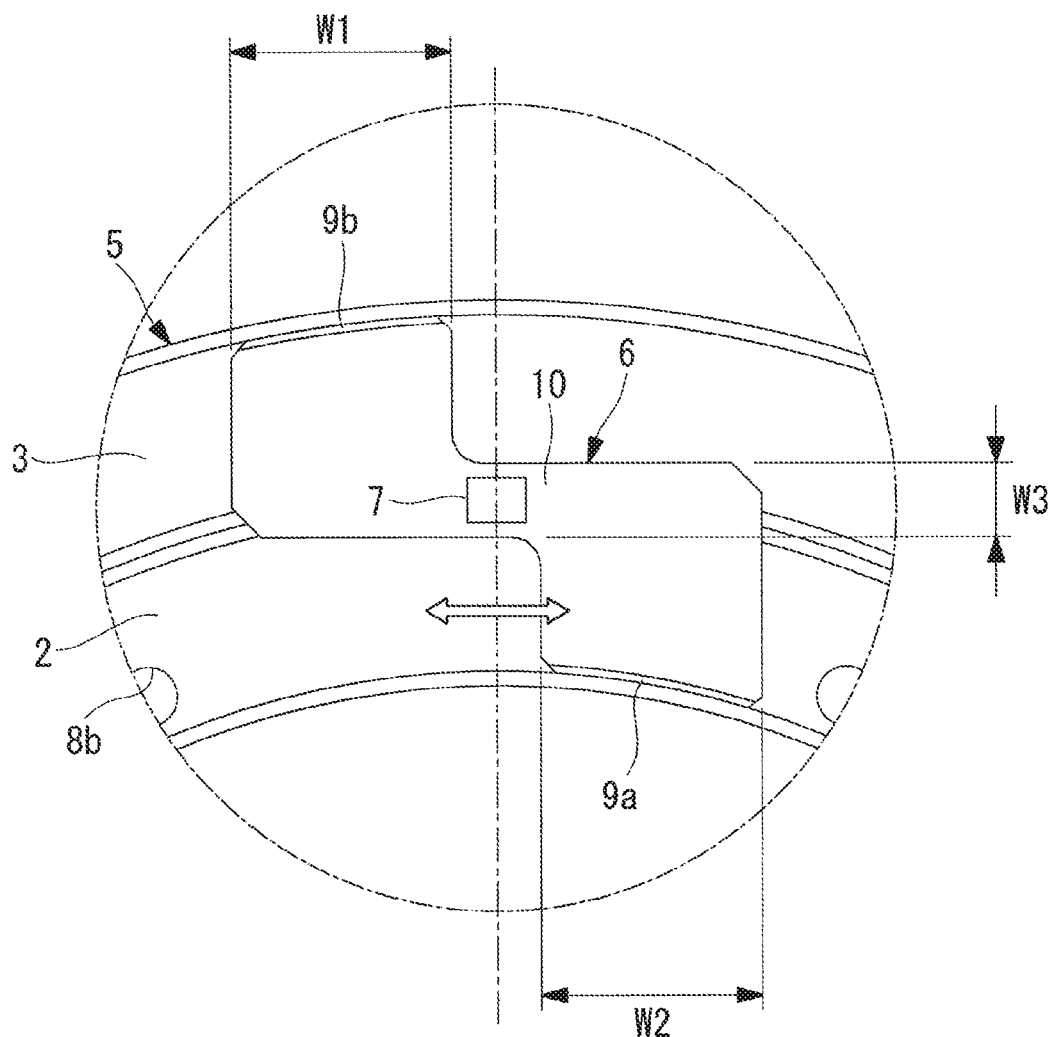
FIG. 4 is an enlarged view showing a connecting member of the torque sensor shown in FIG. 1.

The connecting member 6 is formed in a plate-like shape so as to be disposed along end surfaces of the inner ring 2 and the outer ring 3 of the cross roller bearing 5, the end surfaces being substantially perpendicular to the axial direction of the inner ring 2 and the outer ring 3, as shown in FIGS. 1 and 3, and that is provided with: as shown in FIG. 4, fixing sections 9a and 9b that are respectively fixed to the end surfaces, in the axial direction, of the inner ring 2 and the outer ring 3; and a strain generation section 10 that connects between the fixing sections 9a and 9b.

In the example shown in FIG. 4, the fixing section 9a, which is fixed to the inner ring 2, and the fixing section 9b, which is fixed to the outer ring 3, respectively have width dimensions W1 and W2 in the circumferential direction and are disposed at positions adjacent to each other in the circumferential direction. The fixing section 9a, which is fixed to the inner ring 2, extends radially outward, and the fixing section 9b, which is fixed to the outer ring 3, extends radially inward. The strain generation section 10, which connects between the fixing sections 9a and 9b, has a width dimension W3 in the radial direction and is located, in the vicinity of a boundary position between the inner ring 2 and the outer ring 3, at a position sandwiched between the fixing sections 9a and 9b in the circumferential direction, thus connecting the fixing sections 9a and 9b.

The transverse-sectional area of the strain generation section 10 is set sufficiently smaller than the transverse-sectional areas of the fixing sections 9a and 9b. Accordingly, when a torque for causing the inner ring 2 and the outer ring 3 to relatively rotate acts therebetween, a tensile force or compression force along the circumferential direction acts on the strain generation section 10, as indicated by an arrow in FIG. 4, and a strain occurs exclusively on the strain generation section 10.

The single-axis strain sensor 7 is attached on the surface of the strain generation section 10 while making the detection direction thereof match with the direction in which a tensile force and a compression force act. A wire (not shown) is connected to the single-axis strain sensor 7, and a voltage signal proportional to the amount of strain occurring on the strain generation section 10 is output. Accordingly, a torque can be obtained on the basis of the voltage signal output from the single-axis strain sensor 7. Although examples of the single-axis strain sensor 7 include a semiconductor strain gauge and a metallic-foil strain gauge, the single-axis strain sensor 7 may be a bolt-fixed strain sensor or a displacement detecting device, such as a laser displacement sensor, a laser proximity sensor, or a capacitive proximity sensor. It is possible to use a sensor that can detect the amount of strain from the distance to a target. In this case, it is necessary to dispose, on the same strain generation section 10, a projector for such a displacement detecting device and a wall-like member of the target.

The operation of the thus-configured torque sensor 1 of this embodiment will be described below.

Here, a description will be given of a case in which a torque acting on a joint axis of the robot 100 is detected by using the torque sensor 1 of this embodiment.

Figure 5:
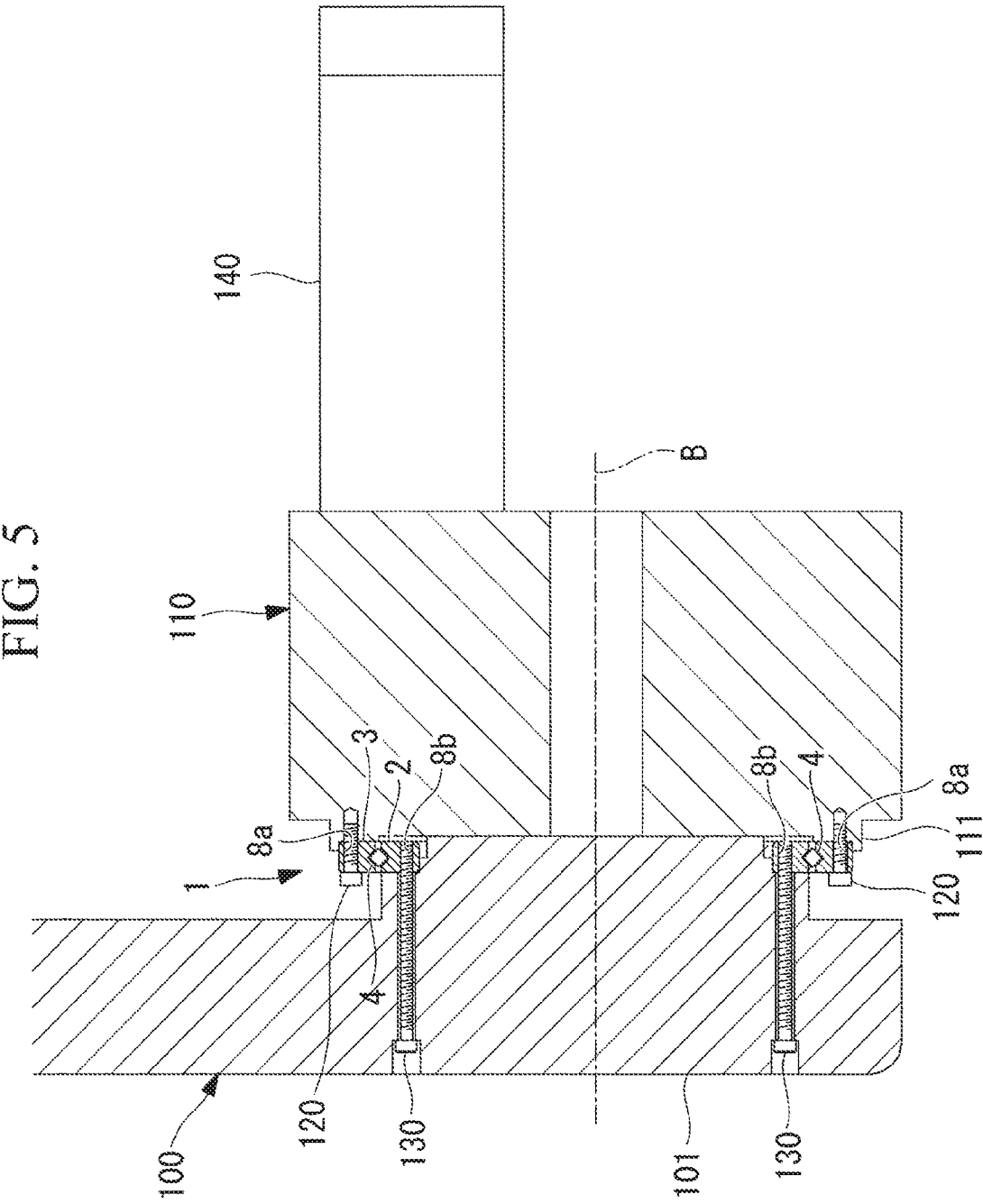
FIG. 5 is a view showing an example case in which the torque sensor shown in FIG. 1 is attached around a joint axis of a robot.

In order to detect a torque acting on the joint axis of the robot 100 by using the torque sensor 1 of this embodiment, as shown in FIG. 5, the torque sensor 1 is fixed such that the axis A of the cross roller bearing 5 is made to match with an axis (rotation axis) B of the joint axis (joint).

In the example shown in FIG. 5, the outer ring 3 is fixed to a speed-reducer output shaft 111 of an actuator 110 that forms the joint axis, with screws 120 by using the through-holes 8*a*, which are formed in the outer ring 3 of the cross roller bearing 5. Furthermore, the inner ring 2 is fixed to the robot arm 101, which is fixed to the speed-reducer output shaft 111 with screws (not shown), with screws 130 by using the screw holes 8*b*, which are formed in the inner ring 2. Accordingly, the torque sensor 1 of this embodiment can be directly fixed to the robot arm 101 and the actuator 110, which are detection targets. In the figure, reference sign 140 denotes a motor that supplies power to the actuator 110.

In this state, when a load acts on the robot arm 101 of the robot 100, thereby causing a torque to act around the axis B of the speed-reducer output shaft 111, the inner ring 2 and the outer ring 3 of the cross roller bearing 5, which constitute the torque sensor 1, are minutely displaced relatively in the circumferential direction; therefore, due to the displacement, a tensile force or a compression force acts on the strain generation section 10, which is located between the fixing sections 9*a* and 9*b* of the connecting member 6, thus, making the strain generation section 10 deform. Accordingly, the amount of strain is detected by the single-axis strain sensor 7, which is attached on the strain generation section 10, and a torque can be detected on the basis of the detected amount of the strain.

In this case, according to the torque sensor 1 of this embodiment, the connecting member 6, which is provided with the strain generation section 10, is fixed to the inner ring 2 and the outer ring 3 of the cross roller bearing 5 so as to extend across them, so that the inner ring 2 and the outer ring 3 are supported so as to relatively move only in the circumferential direction. Therefore, even when loads in various directions act on the robot arm 101, a tensile force or a compression force acts on the strain generation section 10, to which the single-axis strain sensor 7 is attached, only in the circumferential direction.

Specifically, according to the torque sensor 1 of this embodiment, there is an advantage in that, even when loads in various directions act on the robot arm 101, only a torque acting around the axis B of the joint axis can be accurately detected.

As a result, even if a multi-axis strain cancellation mechanism that uses a bridge circuit in which expensive strain sensors are attached in many directions is not adopted, it is possible to accurately detect the torque without detecting the amounts of strain caused by loads in directions other than the rotation direction and to reduce cost. In particular, the cost can be effectively reduced when the torque sensor is installed on each of all joint axes of an articulated robot.

Furthermore, in this embodiment, although a description has been given of an example case in which the single-axis strain sensor 7 detects the amount of strain in the strain generation section 10, the amount of strain to be detected is not necessarily limited to strain on a single axis. It is also possible to adopt a strain sensor for detecting the amount of strain in the strain generation section 10 not only on a single axis but also on multiple axes.

Furthermore, according to the torque sensor 1 of this embodiment, because the connecting member 6, with which the single-axis strain sensor 7 is attached between the inner ring 2 and the outer ring 3, is formed in a plate-like shape so as to be disposed along the end surfaces, in the axial direction, of the inner ring 2 and the outer ring 3, the connecting member 6 has a compact structure slightly protruding in the axial direction of the cross roller bearing 5. Accordingly, the torque sensor 1 can be attached around the joint axis of the robot 100 by using a gap formed between the speed-reducer output shaft 111 and the robot arm 101.

Then, according to the robot 100 in which the torque sensor 1 of this embodiment is attached around each joint axis, even if loads in multiple directions act on the distal end of the robot 100, there is an advantage in that a torque acting on each joint axis can be accurately obtained and controlled.

Note that, in this embodiment, although the cross roller bearing 5 is used as a bearing, the bearing is not limited thereto, and it is also possible to adopt a bearing of another type, such as a four-point contact ball bearing, a tapered roller compound bearing, an angular compound bearing, a double-row ball bearing, a deep-groove ball bearing, or a sliding bearing, as long as the inner ring 2 and the outer ring 3 of the bearing are supported so as to be relatively movable only in the direction of rotation about the predetermined axis A. In particular, because the amount of relative displacement between the inner ring 2 and the outer ring 3 used to detect a torque is a very small amount, a sliding bearing, which has a simple structure, may be used, and, in that case, a further cost reduction can be achieved.

Furthermore, by using a compound ball bearing, it is possible to minimize the influence of rotational friction and to expect an improvement in detection accuracy.

Figure 6:
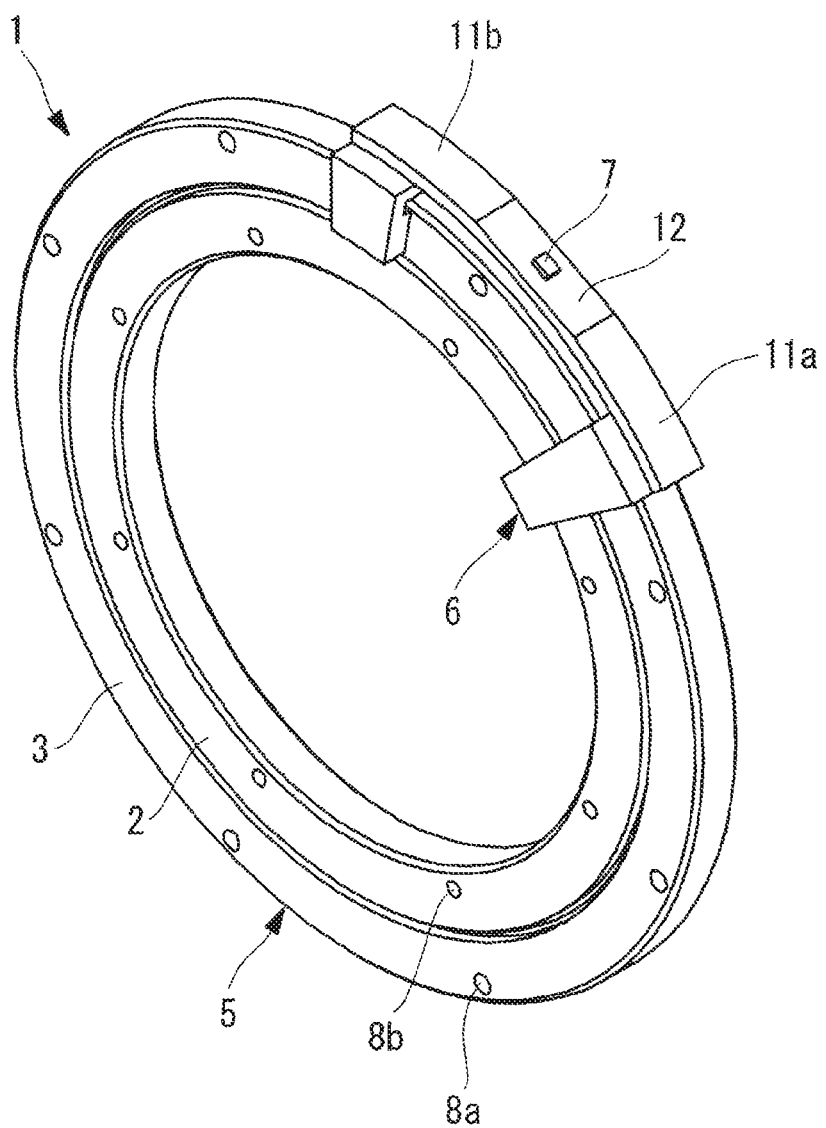
FIG. 6 is a perspective view showing a modification of the torque sensor shown in FIG. 1.

Furthermore, in this embodiment, although a plate-like connecting member that extends along the end surfaces of the inner ring 2 and the outer ring 3 in the axial direction is shown as an example of the connecting member 6, instead of this, as shown in FIG. 6, it is also possible to adopt a connecting member that is provided with: L-shaped fixing sections 11*a* and 11*b* that respectively extend radially outward from the axial-end surfaces of the inner ring 2 and the outer ring 3 and that are bent in the axial direction at a radially outer side of the outer ring 3; and a strain generation section 12 that is located in the circumferential direction so as to connect between the two fixing sections 11*a* and 11*b*, which are disposed at the radially outer side of the outer ring 3 with a gap therebetween.

By doing so, it is possible to dispose the single-axis strain sensor 7 at a radially outer side of the cross roller bearing 5 and to easily perform replacement work if the single-axis strain sensor 7 is damaged. Furthermore, the width of the torque sensor 1 itself can be reduced.

Furthermore, in this embodiment, the single-axis strain sensor 7 may be provided with a correction means that corrects variations in the amount of strain caused by ambient-temperature changes.

By doing so, although, when the ambient temperature in the vicinity of the strain generation section 10 of the connecting member 6 changes, the amount of strain varies according to the amount of the temperature change, the correction means is used to correct the amount of strain corresponding to the change in the ambient temperature, thereby making it possible to further improve the strain detection accuracy.

Furthermore, in this embodiment, although a single-axis strain sensor that is attached on the surface of the strain generation section 10 is shown as an example of the single-axis strain sensor 7, instead of this, it is also possible to adopt a single-axis strain sensor that is fixed with screws.

Furthermore, although a description has been given of an example case in which the torque sensor 1 is provided with the single single-axis strain sensor 7, two or more single-axis strain sensors 7 may also be arranged side by side on the strain generation section 10, 12 for failure detection. They may be arranged in parallel or in series.

With this configuration, it is possible to determine whether one single-axis strain sensor 7 operates normally, by comparing strain data of another single-axis strain sensor 7. Even if the one single-axis strain sensor 7 fails, it is possible to safely and immediately stop the robot 100 by using strain information obtained from the remaining normal single-axis strain sensor 7, which has not failed.

Figure 7:
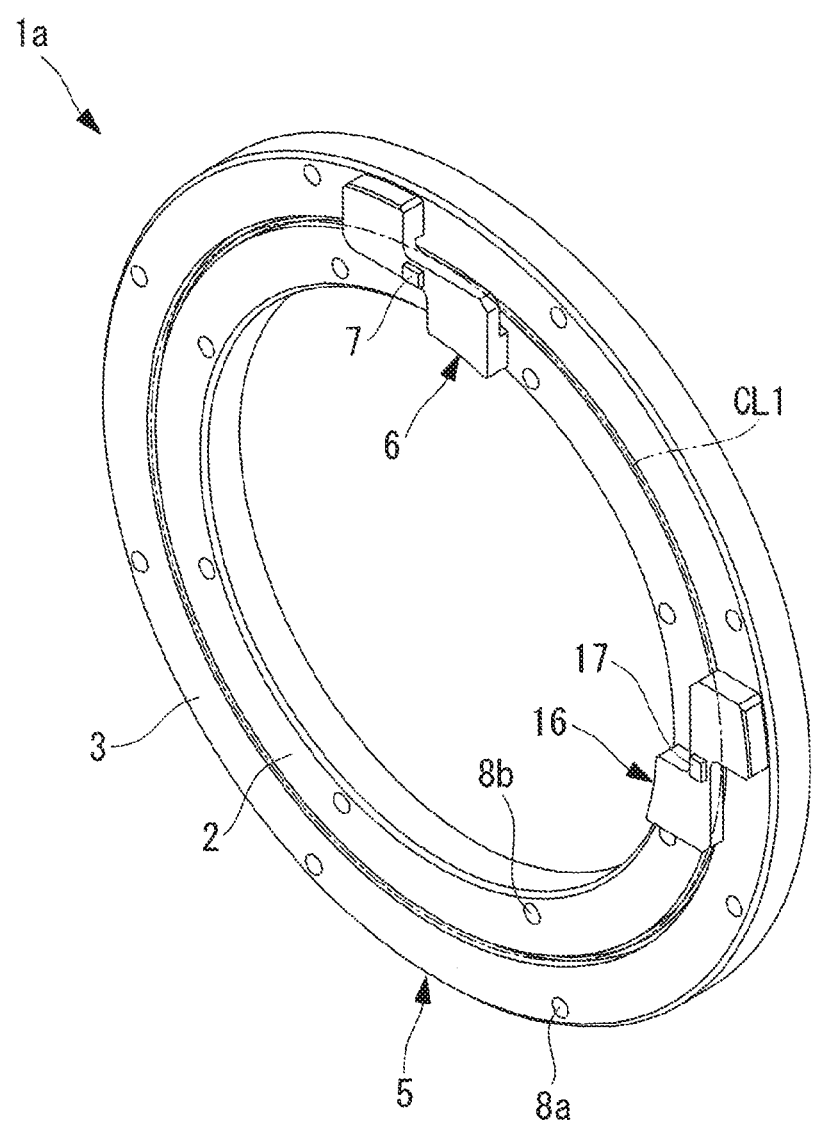
FIG. 7 is a perspective view showing a modification of the torque sensor shown in FIG. 1.

FIG. 7 shows a torque sensor 1a, according to a modification, that is provided with two connecting members 6 and 16. As shown in FIG. 7, compared with the torque sensor 1 of the embodiment, the torque sensor 1a is further provided with, in addition to the connecting member 6, the connecting member 16, to which a single-axis strain sensor (strain sensor) 17 is fixed. The connecting member 16 and the single-axis strain sensor 17 have the same configurations as the connecting member 6 and the single-axis strain sensor 7. The connecting member 16 is disposed on a line CL1 at the same rotation circumference as the connecting member 6 at a different position in the circumferential direction and is fixed to the outer ring 3 and the inner ring 2. Thus, the single-axis strain sensor 17 can detect the amount of strain occurring on the connecting member 16.

In this way, the torque sensor 1a of the modification shown in FIG. 7 is provided with the two connecting members 6 and 16 and the two single-axis strain sensors 7 and 17 at the same rotation circumference, thereby making it possible to output detection values from the plurality of systems. Note that, in the modification shown in FIG. 7, although a description has been given of an example case in which the torque sensor 1a is provided with the two connecting members 6 and 16 and the two single-axis strain sensors 7 and 17, the number of connecting members and the number of single-axis strain sensors to be provided in the torque sensor may be three or more. Furthermore, the two connecting members 6 and 16 may have the same shape, and the two single-axis strain sensors 7 and 17 may be the same single-axis strain sensors.

Figure 8:
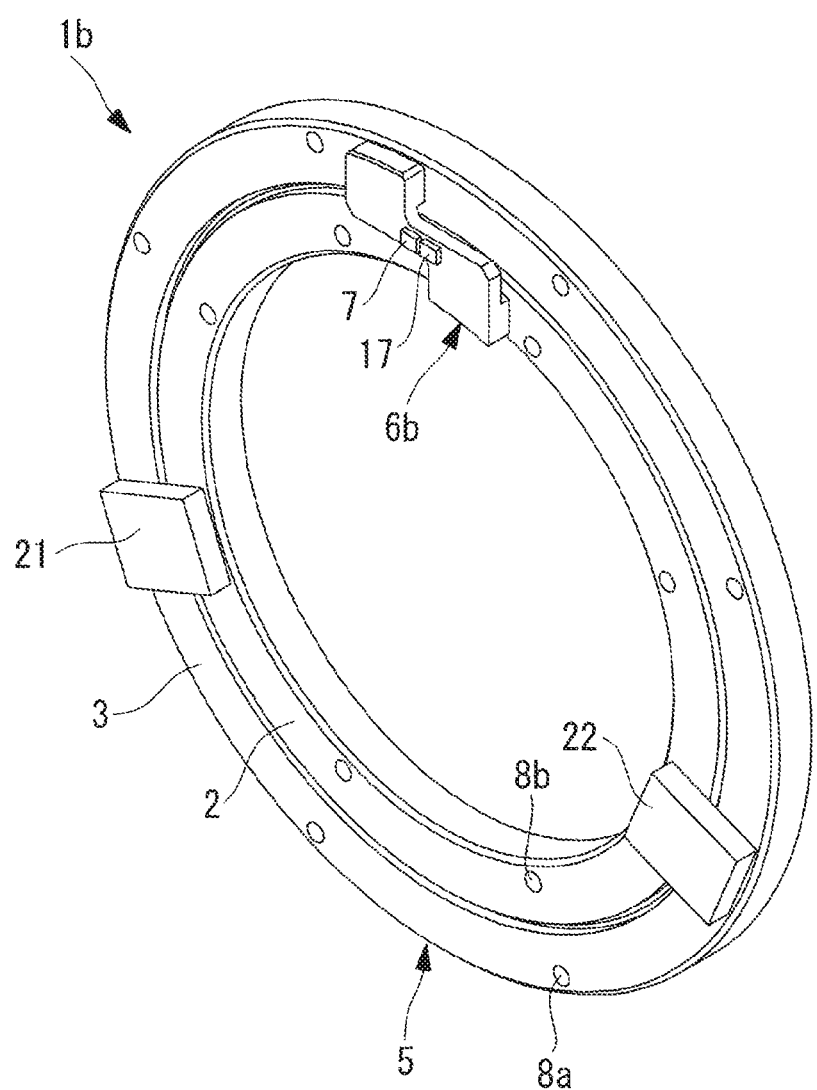
FIG. 8 is a perspective view showing a modification of the torque sensor shown in FIG. 1.

FIG. 8 shows a torque sensor 1b, according to another modification, that is provided with two reinforcing members 21 and 22 that are each fixed to the outer ring 3 and the inner ring 2 and that each couple the outer ring 3 and the inner ring 2, and in which two single-axis strain sensors 7 and 17 are disposed on a connecting member 6b. Because the reinforcing members 21 and 22 are each fixed to the outer ring 3 and the inner ring 2, the amount of strain occurring on the connecting member 6b is less than the amount of strain occurring on the connecting member 6 fixed in the torque sensor 1 according to the embodiment. Thus, with the reinforcing members 21 and 22, detection values output from the single-axis strain sensors 7 and 17, which are disposed on the connecting member 6b, can be adjusted. The two single-axis strain sensors 7 and 17 may be the same single-axis strain sensors.

Furthermore, in the torque sensor 1b, shown in FIG. 8, the two single-axis strain sensors 7 and 17 are disposed on the strain generation section 10 of the connecting member 6b. Thus, by comparing the detection values output from the two single-axis strain sensors 7 and 17, it is possible to determine whether the single-axis strain sensors 7 and 17 operate normally. Note that a torque sensor of another form may be provided with three or more single-axis strain sensors that are disposed on the single connecting member 6 or may be provided with one reinforcing member or three or more reinforcing members. Although the reinforcing members 21 and 22, shown in FIG. 8, are shown as example reinforcing members provided in the torque sensor, the reinforcing members provided in the torque sensor can be variously modified in shape as long as they are each fixed to the outer ring 3 and the inner ring 2. The reinforcing members may have the same shape as the connecting member 6b, shown in FIG. 8, for example, or may have a disc shape or the like. The reinforcing members may be disposed on the opposite surface of the torque sensor 1b from the surface thereof on which the connecting member 6 is disposed.

Figure 9:
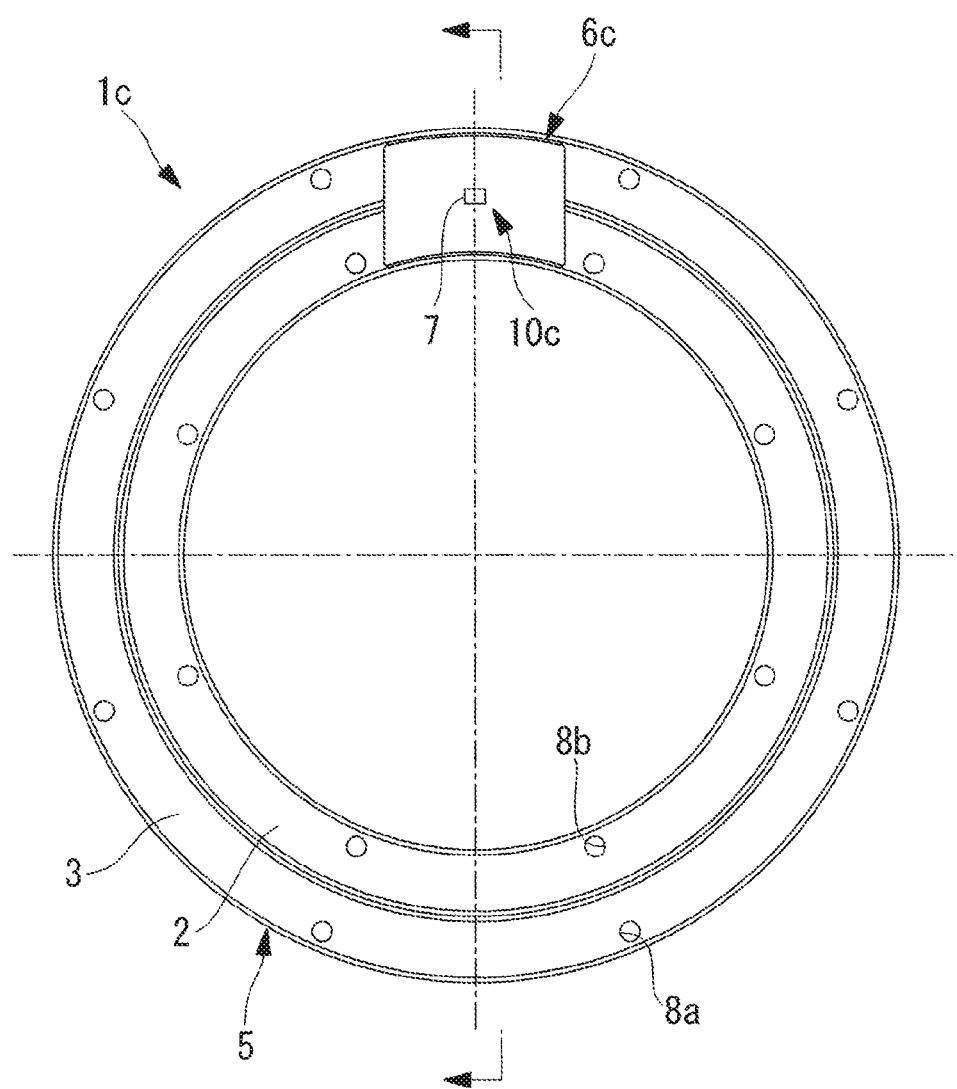
FIG. 9 is a front view showing a modification of the torque sensor shown in FIG. 1.

In the torque sensor 1 according to the above-described embodiment, a description has been given of the connecting member 6 in which the transverse-sectional areas of the fixing sections 9a and 9b are larger than the transverse-sectional area of the strain generation section 10; however, the relationship among the transverse-sectional areas of the respective sections included in the connecting member 6 can be variously modified. For example, as shown in FIG. 9, a connecting member 6c provided in a torque sensor 1c according to a modification has a shape close to a rectangle, in which both end surfaces of a fan shape are made to be parallel to each other, when viewed from the front. By adopting the connecting member 6c, even in a case in which a large torque is applied to the torque sensor 1c, provision of the reinforcing members 21 and 22, shown in FIG. 8, is unnecessary. As an extreme example, the connecting member may have a doughnut-like disc shape using the entire circumference of the inner ring 2 and the outer ring 3 of the bearing. Unlike the strain generation section 10 shown in FIG. 4, a strain generation section 10c where the single-axis strain sensor 7 detects a strain need not be formed to be smaller in the transverse-sectional area than the other sections. In another modification, in the connecting member, the transverse-sectional area of the strain generation section may be larger than the transverse-sectional areas of the fixing sections.

From the above-described embodiments and modifications thereof, the following aspects of the invention are derived.

According to one aspect, the present invention provides a torque sensor including: a bearing that is provided with an inner ring and an outer ring that are supported so as to be relatively movable only in the direction of rotation about a predetermined axis; a connecting member that is provided with fixing sections that are respectively fixed to the inner ring and the outer ring and a strain generation section that connects between the fixing sections; and a strain sensor that is disposed on the connecting member so as to be capable of detecting a strain at least in the circumferential direction.

According to this aspect, the axis is made to match with the rotation axis of a detection target that is driven about the rotation axis, and the inner ring and the outer ring, which are disposed so as to extend across a section to which a torque is transferred, are fixed to the detection target, the inner ring and the outer ring are relatively rotated when a torque is applied to the detection target, and a strain occurs in the strain generation section of the connecting member. When the strain sensor detects the amount of strain, a torque acting on the detection target can be obtained on the basis of the detected amount of the strain.

In this case, because the inner ring and the outer ring of the bearing are supported so as to be relatively movable only in the direction of rotation about the predetermined axis, even in a case in which the torque sensor is attached to a joint of a robot on which loads in various directions act, it is possible to prevent loads in directions other than the rotation direction from acting on the strain generation section of the connecting member. As a result, even if a strain cancellation mechanism is not constituted of a bridge circuit that uses a plurality of strain gauges, a torque in the rotation direction can be accurately detected.

In the above-described aspect, the transverse-sectional area of the strain generation section may be smaller than the transverse-sectional areas of the fixing sections.

By doing so, the amount of strain in the strain generation section is increased, and thus, the strain sensor can accurately detect the strain in the circumferential direction.

In the above-described aspect, the inner ring and the outer ring may be provided with fixing means that fix the inner ring and the outer ring to a detection target.

By doing so, the inner ring and the outer ring can be directly fixed to the detection target by the fixing means.

In the above-described aspect, the connecting member may be formed in a plate-like shape extending along side surfaces of the inner ring and the outer ring, the side surfaces being substantially perpendicular to the rotation axis of the inner ring and the outer ring.

By doing so, the plate-like connecting member is disposed along the side surfaces of the inner ring and the outer ring, thus making it possible to form the connecting member so as not to protrude in the radial direction.

In the above-described aspect, the strain sensor may be provided with a correction means that corrects a strain-amount variation caused by an ambient-temperature change.

By doing so, because ambient temperature changes alone cause the amount of strain to vary, the amount of strain corresponding to this ambient-temperature change is corrected, thereby making it possible to further improve the strain detection accuracy.

In the above-described aspect, the strain sensor may be fixed to the connecting member with screws.

By doing so, although strain gauges are generally fixed by an adhesive in most cases, it is necessary to ensure that the adhesive layer is uniform. Through screw fixing, the ease of assembly can be improved.

In the above-described aspect, a plurality of strain sensors that are each the same as the strain sensor may be disposed side by side on the strain generation section.

By doing so, it is possible to determine whether any one of the strain sensors operates normally, by comparing strain data of another one of the strain sensors. Even if one of the strain sensors fails, it is possible to safely and immediately stop the robot by using strain information obtained from the remaining normal strain sensor, which has not failed.

In the above-described aspect, the bearing may be a cross roller bearing.

By doing so, the inner ring and the outer ring are supported so as to be relatively movable only in the direction of rotation about the axis, and, even in a case in which the torque sensor is attached to a joint of a robot on which loads in various directions act, it is possible to easily prevent loads in directions other than the rotation direction from acting on the strain generation section of the connecting member.

In the above-described aspect, the bearing may be a compound ball bearing.

In the above-described aspect, the bearing may be a sliding bearing.

By doing so, the cost can be reduced due to a simple-structure sliding bearing.

In the above-described aspect, a plurality of connecting members that are each the same as the connecting member may be provided at intervals in the circumferential direction around the axis; and the strain sensor may be disposed on the strain generation section of each of the connecting members.

By doing so, a plurality of identical connecting members on each of which the strain sensor is disposed are provided, thus making it possible to easily configure a torque sensor that outputs detection values from the plurality of systems.

Furthermore, the above-described aspect may further include at least one reinforcing member that is fixed to each of the inner ring and the outer ring and that couples the inner ring and the outer ring.

By doing so, because the reinforcing member reduces the amount of strain acting on the strain generation section, the amount of strain detected by the strain sensor is reduced compared with a case in which the reinforcing member is not provided. Thus, the detection value of the strain sensor can be adjusted by means of the reinforcing member.

Furthermore, according to another aspect, the present invention provides a robot to which one of the above-described torque sensors is attached while making the axis of the bearing match with the rotation axis of each joint.

Advantageous Effects of Invention

According to the present invention, an advantageous effect is afforded in that it is possible to accurately detect a torque in the rotation direction while reducing cost by reducing the number of strain sensors.

REFERENCE SIGNS LIST 1, 1a, 1b, 1c torque sensor
2 inner ring
3 outer ring
5 cross roller bearing (bearing)
6, 6b, 6c, 16 connecting member
7, 17 single-axis strain sensor (strain sensor)
8a through-hole (fixing means)
8b screw hole (fixing means)
9a, 9b, 11a, 11b fixing section
10, 12 strain generation section
100 robot
101 robot arm (detection target)
110 actuator (detection target)

A axis
B axis (rotation axis)

The invention claimed is:

1. A torque sensor comprising:
a bearing that is provided with an inner ring and an outer ring that are supported so as to be relatively movable only in the direction of rotation about a predetermined axis;
a connecting member that is provided with fixing sections that are respectively fixed to the inner ring and the outer ring and a strain generation section that connects between the fixing sections, the connecting member being separated from the bearing; and
a strain sensor that is disposed on the connecting member so as to be capable of detecting a strain at least in the circumferential direction.

2. The torque sensor according to claim 1, wherein the connecting member is formed in a plate-like shape extending alongside surfaces of the inner ring and the outer ring, the side surfaces being substantially perpendicular to the rotation axis of the inner ring and the outer ring.

3. The torque sensor according to claim 1, wherein the transverse-sectional area of the strain generation section is smaller than the transverse-sectional areas of the fixing sections.

4. The torque sensor according to claim 1, wherein the inner ring and the outer ring are provided with fixing means that fix the inner ring and the outer ring to a detection target.

5. The torque sensor according to claim 1, wherein the strain sensor is provided with a correction means that corrects a strain-amount variation caused by an ambient-temperature change.

6. The torque sensor according to claim 1, herein the strain sensor is fixed to the connecting member with screws.

7. The torque sensor according to claim 1, wherein a plurality of strain sensors that are each the same as the strain sensor are disposed side by side on the strain generation section.

8. The torque sensor according to claim 1, wherein the bearing is a cross roller bearing.

9. The torque sensor according to claim 1, wherein the bearing is a compound ball bearing.

10. The torque sensor according to claim 1, wherein the bearing is a sliding bearing.

11. The torque sensor according to claim 1, wherein:
a plurality of connecting members that are each the same as the connecting member are provided at intervals in the circumferential direction around the axis; and
the strain sensor is disposed on the strain generation section of each cif the connecting members.

12. The torque sensor according to claim 1, further comprising at least one reinforcing member that is fixed to each of the inner ring and the outer ring and that couples the inner ring and the outer ring.

13. A robot to which a torque sensor according to claim 1 is attached while making the axis of the bearing match with the rotation axis of each joint.

14. A torque sensor comprising:
a bearing that is provided with an inner ring and an outer ring that are supported so as to be relatively movable only in the direction of rotation about a predetermined axis;
a connecting member that is provided with fixing sections that are respectively fixed to the inner ring and the outer ring and a strain generation section that connects between the fixing sections;
a strain sensor that is disposed on the connecting member so as to be capable of detecting a strain at least in the circumferential direction; and
wherein the connecting member is formed in a plate-like shape extending alongside surfaces of the inner ring and the outer ring, the side surfaces being substantially perpendicular to the rotation axis of the inner ring and the outer ring.

15. The torque sensor according to claim 14, wherein the transverse-sectional area of the strain generation section is smaller than the transverse-sectional areas of the fixing sections.

16. The torque sensor according to claim 14, wherein the inner ring and the outer ring are provided with fixing means that fix the inner ring and the outer ring to a detection target.

17. The torque sensor according to claim 14, wherein the strain sensor is provided with a correction means that corrects a strain-amount variation caused by an ambient-temperature change.

18. The torque sensor according to claim 14, wherein the strain sensor is fixed to the connecting member with screws.

19. The torque sensor according to claim 14, wherein a plurality of strain sensors that are each the same as the strain sensor are disposed side by side on the strain generation section.

20. The torque sensor according to claim 14, wherein the bearing is a cross roller bearing.

21. The torque sensor according to claim 14, wherein the bearing is a compound ball bearing.

22. The torque sensor according to claim 14, wherein the bearing is a sliding bearing.

23. The torque sensor according to claim 14, wherein:
a plurality of connecting members that are each the same as the connecting member are provided at intervals in the circumferential direction around the axis; and
the strain sensor is disposed on the strain generation section of each of the connecting members.

24. The torque sensor according to claim 14, further comprising at least one reinforcing member that is fixed to each of the inner ring and the outer ring and that couples the inner ring and the outer ring.

25. A robot to which a torque sensor according to claim 14 is attached while making the axis of the bearing match with the rotation axis of each joint.

* * * * *